US012498837B2

(12) United States Patent
Neff et al.

(10) Patent No.: US 12,498,837 B2
(45) Date of Patent: Dec. 16, 2025

(54) MOUSE CURSOR AND CONTENT MIGRATION BETWEEN 3D SPACE AND PHYSICAL FLAT DISPLAYS

(71) Applicant: MICROSOFT TECHNOLOGY LICENSING, LLC, Redmond, WA (US)

(72) Inventors: Joshua Kyle Neff, Renton, WA (US); Dominik Hofacker, Seattle, WA (US); Kristian Jose Davila, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 315 days.

(21) Appl. No.: 17/748,525

(22) Filed: May 19, 2022

(65) Prior Publication Data

US 2023/0376161 A1   Nov. 23, 2023

(51) Int. Cl.
| | |
|---|---|
| *G06F 3/04812* | (2022.01) |
| *G06F 3/01* | (2006.01) |
| *G06F 3/0346* | (2013.01) |
| *G06T 19/00* | (2011.01) |
| *G06T 19/20* | (2011.01) |

(52) U.S. Cl.
CPC ......... *G06F 3/04812* (2013.01); *G06F 3/011* (2013.01); *G06F 3/0346* (2013.01); *G06T 19/006* (2013.01); *G06T 19/20* (2013.01); *G06T 2200/24* (2013.01); *G06T 2219/2004* (2013.01); *G06T 2219/2012* (2013.01); *G06T 2219/2021* (2013.01); *G06T 2219/2024* (2013.01)

(58) Field of Classification Search
CPC .... G06F 3/04812; G06F 3/011; G06F 3/0346; G06F 1/163; G06F 3/04815; G06T 19/006; G06T 19/20; G06T 2200/24; G06T 2219/2004; G06T 2219/2012; G06T 2219/2021; G06T 2219/2024; G06V 20/20
See application file for complete search history.

(56) References Cited

U.S. PATENT DOCUMENTS

| | | |
|---|---|---|
| 11,249,315 B2 | 2/2022 | Huang et al. |
| 2015/0205106 A1 | 7/2015 | Norden |
| (Continued) | | |

OTHER PUBLICATIONS

"International Search Report and Written Opinion Issued in PCT Application No. PCT/US23/013458", Mailed Date: May 25, 2023, 14 Pages. (MS# 411363-WO-PCT).

*Primary Examiner* — Chong Wu
(74) *Attorney, Agent, or Firm* — Workman Nydegger

(57) ABSTRACT

Systems are configured to control transitions and displays of interface objects that are selectively moved across boundary transitions of physical display screens within augmented-reality scenes. In some instances, when a virtual object instance of an interface object is moved into the bounded area of a physical display screen within an augmented-reality scene a corresponding real-world object instance of the interface object is generated and rendered within the bounded display area of the display screen. In other instances, when user input is received for moving a real-world object instance of an interface object outside of the bounded display area of a display screen within an augmented-reality scene, a corresponding virtual object instance of the interface object is generated and rendered outside of the display screen within the augmented-reality scene.

10 Claims, 12 Drawing Sheets

(56) References Cited

U.S. PATENT DOCUMENTS

| | | |
|---|---|---|
| 2016/0027214 A1 | 1/2016 | Memmott et al. |
| 2016/0027216 A1 | 1/2016 | Christen et al. |
| 2017/0131964 A1 | 5/2017 | Baek et al. |
| 2018/0095635 A1* | 4/2018 | Valdivia ............. G02B 27/0093 |
| 2019/0164347 A1 | 5/2019 | Floury et al. |

* cited by examiner

MOUSE CURSOR AND CONTENT MIGRATION BETWEEN 3D SPACE AND PHYSICAL FLAT DISPLAYS

BACKGROUND

Mixed-reality computer systems, which include augmented-reality systems and virtual-reality systems, have received significant interest because of their ability to create immersive experiences for users.

By way of example, conventional augmented-reality systems create an augmented-reality environment where virtual objects are visually projected to a user within the real world. With this technology, a user is able to simultaneously view both the projected virtual objects as well as the physical real-world objects within the same augmented-reality scene.

Conventional virtual-reality systems are similarly immersive, but they completely obstruct a user's direct-line of sight to the real world. They function by providing projections for the entire virtual environments displayed to the users. In some instances, the virtual projections include reprojections of real-world objects.

In other instances, hybrid mixed-reality systems have been configured to enable passthrough images of the real world to be fused with the projections of virtual environments by a mixed-reality system.

Unless specifically stated, the descriptions and disclosure provided herein apply to augmented-reality systems and/or hybrid virtual-reality systems in which a user is able to view real-world objects (e.g., physical display devices) with either their own direct-line of sight and/or with the assistance of passthrough projections. Both of the foregoing mixed-reality systems are generally referred to herein as augmented-reality systems.

While different augmented-reality systems may vary in their overall configurations, most augmented-reality systems will at least include a display that is configured to be worn by a user (e.g., a head-mounted device, hereinafter "HMD"). Although handheld display devices and stationery off-body display devices can also be used.

The augmented-reality displays are configured to project or otherwise provide overlapping and/or integrated visual information within the user's field of view to generate an augmented-reality environment for the user (e.g., a user wearing the HMD). To do this effectively, most augmented-reality systems are also configured with sensors for detecting proximity and positioning of the user's eyes relative to the display, and for tracking movements of the user's eyes to ensure the virtual projections are presented in the right location and with the right orientation within the augmented-reality environment presented to the user.

With regard to the foregoing, it will be appreciated that the term "augmented-reality environment" is also sometimes referred to herein as an "augmented-reality environment," "environment," "computer-generated scene," and/or simply as a "scene". These terms are interchangeably used herein, inasmuch as they all relate to an experience in which virtual content is projected within the real-world to users viewing the augmented-reality environment(s)/scene(s).

To further illustrate the utility of an augmented-reality system, a simple example an augmented-reality scene will be described in which an application interface is projected within the real-world to a user wearing an HMD. In this scenario, a virtual object that represents the application interface is projected to the user at a predetermined distance away from the user as the user walks around the virtual environment.

The virtual object is generated by visual information that is projected to the user through the HMD in such a manner that it appears to remain at the fixed-distance from the user within the augmented-reality environment. The manner in which the visual information is processed and projected to the user through the HMD is based on sensor data that identifies positioning of the real-world objects relative to the user and the determined eye position and gaze of the user relative to the HMD and the augmented-reality scene.

Within this example, the user can also provide gestures and other inputs that are detected by sensors and that are operable to interact with elements of the virtual object and to trigger corresponding functions of the underlying application that is being projected as the virtual object. Such systems and configurations are well-known to those of skill in the art. The notable benefits and practical applications for enabling a user to interface with and control applications via virtual interfaces within augmented-reality environments are also well-known.

As advances in hardware capabilities and rendering technologies continue to increase the realism of virtual projections and the corresponding demand for augmented-reality systems will continue to increase. To address this increasing demand, and to further improve the over-all consumer experience, it is also important to continue improving and developing new techniques for facilitating user interactions with the virtual objects in augmented-reality environments, and particularly for interacting with virtual objects representing application interfaces. The foregoing is particularly true when considering the variability in needs and desires of different users, as well as the different environments and circumstances in which the systems may be used.

By way of example, there are some circumstances in which a user may prefer to interact with virtual interface(s) of an application in an augmented-reality environment and other circumstances in which the same or different user(s) may choose to interact with the application through physical display interface(s). Sometimes, a user may even wish to switch back and forth between different virtual and physical display interfaces during a single work/play session. However, conventional systems are not presently configured to facilitate such transitioning in an intuitive and a user-friendly manner.

Accordingly, there exists a strong need in the field to improve a user's interactive experience with virtual objects in augmented-reality environments and, particularly, for facilitating the manner in which a user is enabled to transition between different instances of applications in augmented-reality environments.

The subject matter claimed herein is not limited to embodiments that solve any disadvantages or that operate only in environments such as those described above. Rather, this background is provided to illustrate only one exemplary technology area where some embodiments described herein may be practiced.

BRIEF SUMMARY

Disclosed embodiments are directed to systems, devices, and methods for facilitating the control and rendering of interface objects that are selectively moved across boundary transitions of physical display screens within augmented-reality environment(s)/scene(s).

In some embodiments, when a virtual instance of an interface object is moved into the bounded area of a physical display screen within an augmented-reality scene, a corresponding real-world object instance of the interface object is generated and rendered within the bounded display area of the display screen.

In other embodiments, user input is received for moving a control object from a first location to a second location in an augmented-reality scene. In the first location, the control object is rendered as a real-world object instance of the control object within the bounded area of a display screen. The second location is at least partially outside of the bounded display area of the display screen. The control object is effectively moved from the first to the second location in response to the user input, by rendering a virtual instance of the control object outside of the display screen.

Disclosed embodiments also include systems that are configured to render augmented-reality scenes on an HMD or other wearable display in which an interactive virtual object instance is projected to a user. The interactive virtual object instance visually represents a controllable object (e.g., interface or mouse prompt) of an application that is running on the system. The interactive virtual object instance is rendered in the scene at a first position that is outside of a bounded display area of a physical real-world display screen that is also visible within the scene.

Such systems are also configured to detect user input for selecting and moving the interactive virtual object instance from the first position to a second position within the augmented-reality scene, wherein the second position at least partially overlaps with the bounded display area of the physical real-world display screen within the scene.

These systems are also configured to render a representation of the controllable interface object entirely within the bounded display area of the physical real-world display, such as, for example, in response to detecting the user input for selecting and moving the interactive virtual object instance from the first position to the second position within the augmented-reality scene.

This rendering of the controllable interface object may include, rendering the interactive virtual object instance entirely within the bounded display area of the physical real-world display screen as a visual representation of the real-world object instance of the controllable interface object at a third position within the augmented-reality scene, and which may be the same as or different than the second position, and which occurs in response to making a determination to not render the real-world object instance of the controllable interface object within the bounded display area of the physical real-world display screen.

Alternatively, the rendering of the controllable interface object entirely within the bounded display area of the physical real-world display, based on the user input, is performed by the systems generating and rendering the real-world object instance of the controllable interface object of the application within the bounded display area of the physical real-world display screen.

By way of further example, some disclosed systems are configured to generate and render a real-world object instance of a controllable interface object of an application running on the computing system at a location within a bounded display area of a physical real-world display connected to the computing system, as well as to detect user input for rendering the controllable interface object outside of the bounded display area of the physical real-world display.

In response to this detected user input, the systems are configured to generate and render an interactive virtual object instance of the controllable interface object at a location that is at least partially outside of the bounded display area of the physical real-world display and within an augmented-reality scene that includes visibility of the physical real-world display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the embodiments may be realized and obtained by means of the instruments and combinations particularly pointed out in the appended claims. Features of the embodiments will become more fully apparent from the following description and appended claims or may be learned by the practice of the embodiments as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments are directed to systems, hardware storage devices, and methods for facilitating the manner in which a user interacts with content included within an augmented-reality scene and, even more particularly, for facilitating the control and rendering of virtual and real-world display interface objects in response to user input directed at moving the interface objects across the boundaries of display areas of physical display screens.

In some instances, a transition of rendering interface objects occurs within an augmented-reality scene when a virtual instance of an interface object is moved into the bounded area of a physical display screen, with the transition including a system generating and rendering a real-world object instance of the interface object within the bounded display area of the display screen.

In other instances, a transition of rendering interface objects occurs within an augmented-reality scene when user input is received for moving a real-world object instance of an interface object outside of the bounded display area of a display screen and a corresponding virtual instance of the object is responsively generated and rendered outside of the display screen within the augmented-reality scene.

The disclosed embodiments may be implemented to overcome many of the technical difficulties and computational expenses associated with rendering interactive virtual content in an augmented-reality scene. By way of example, technical benefits associated with the disclosed embodiments include the reduction in computational resources that would be required for a user to manually open and close different instances of an application for each intended use of the application within an augmented-reality scene, as well as the reduction in computational resources that would be required for maintaining multiple instances of an application in an open state, even though some circumstances would necessitate only a single instance to be open at a time.

Additional benefits include facilitating the integrated control of different types of interfaces (e.g., virtual and physical display interfaces) with a common control object (e.g., mouse prompt, hand, or other control object), whether that control object is a physical display control object or a virtual object. The disclosed embodiments can also improve the overall consumer experiences associated with utilizing and transitioning between different types of interfaces in mixed-reality environments. The foregoing benefits will be more apparent from the examples that will be described below.

Exemplary Computing Systems

Figure 1:
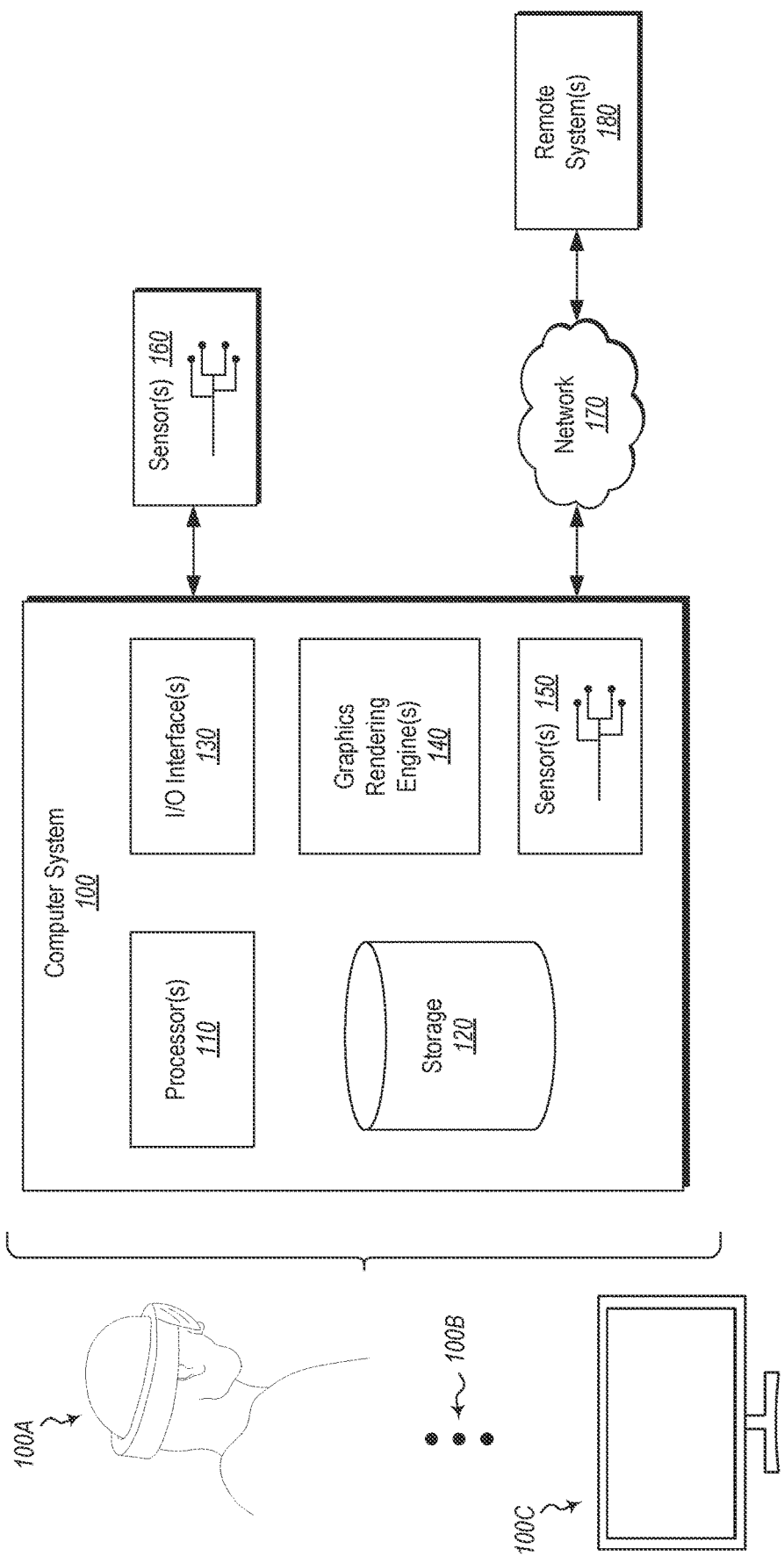
FIG. 1 illustrates an abstract view of a computer system that includes and/or that may be used to implement aspects of the disclosed embodiments.

Attention is now directed to FIG. 1, which illustrates an exemplary computing system 100 that can be used to render an augmented-reality environment. This system may take various different forms and incorporate various discrete components. For example, in FIG. 1, the computer system 100 is depicted as being configured as or including a wearable HMD 100A, or another device 100B, such as, but not limited to a display device 100C. Other devices 100B, may include, for example, a desktop computer, a laptop, a tablet, a mobile phone, or any other computing device.

In its most basic configuration, the computer system 100 includes at least one hardware processing unit 110 and storage 120. The storage 120 may be physical system memory, which may be volatile, non-volatile, or some combination of the two. The term "memory" may also be used herein to refer to non-volatile mass storage such as physical storage media. If the computing system 100 is distributed, the processing, memory, and/or storage capability may be distributed as well. As used herein, the term "executable module," "executable component," or even "component" can refer to software objects, routines, or methods that may be executed on the computing system 100. The different components, modules, engines, and services described herein may be implemented as objects or processors that execute on the computing system 100 (e.g. as separate threads).

The disclosed embodiments may comprise or utilize a special-purpose or general-purpose computer including computer hardware, such as, for example, one or more processors (such as processor 110) and system memory (such as storage 120), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer hardware storage devices. Computer-readable media that carry computer-executable instructions are transmission media. Thus, by way of example and not limitation, the current embodiments can comprise at least two distinctly different kinds of computer-readable media: (i) computer hardware storage devices and (ii) transmission media.

Computer hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

As also shown in FIG. 1, the computer system 100 comprises various different components including input/output ("I/O") interface(s) 130, graphics rendering engine(s) 140, and one or more sensors 150. The computer system 100 may also be connected (via a wired or wireless connection) to external sensors 160 (e.g., one or more remote cameras, accelerometers, gyroscopes, acoustic sensors, magnetometers, etc.). Further, the computer system 100 may also be connected through one or more wired or wireless networks 170 to remote systems(s) 180 that are configured to perform any of the processing described with regard to computer system 100.

During use, a user of the computer system 100 is able to perceive information (e.g., an augmented-reality scene) through a display that is included within the I/O interface(s) 130, and which is visible to the user. The I/O interface(s) 130 and sensors 150/160 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

In some instances, the positioning and movement of the user and the objects (both virtual and actual) are continuously monitored. This monitoring specifically detects any variation in the position and the movement of the objects, such as a detected change in position, velocity, orientation, or acceleration. These movements can be absolute movements and/or relative movements, such as compared to a relative positioning of the HMD, and such that movements/positioning of the HMD will be calculated into the relative movements/positioning of the objects as they are presented in the scene.

The graphics rendering engine 140 is configured, with the processor(s) 110, to render one or more virtual objects within the scene, including the virtual object instances of application interfaces.

In some embodiments, the graphics rendering engine 140 renders hand occlusions, or other types of occlusions, which are mapped to the relative positions of real-world objects. As a result, the virtual objects accurately move in response to movement of the real-world objects. The graphics rendering engine 140 is also configured to render one or more occlusions that are purely virtual (without being mapped to real-world objects) but which are, nonetheless, positioned and moved responsively to user input as the user interacts within the scene (e.g., an interactive virtual news feed may be projected for the user to interact with, and this news feed may be projected without consideration of the locations of any real-world objects).

The graphics rendering engine(s) 140, which may include one or more GPUs, may be configured to render the occlusions with certain display properties. These properties include coloring, transparency or opaqueness, texturing, edge definition (e.g., thickness and/or sharpness vs. blurring and/or feathering), size, and so forth. When certain position (e.g., distance and or movement) thresholds are detected for the occlusion, then one or more combinations of the display properties for the occlusion will be modified (at least while the detected positioning and/or movement meets or exceeds the thresholds).

A "network," like the network 170 shown in FIG. 1, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 100 will include one or more communication channels that are used to communicate with the network 170.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Figure 2:
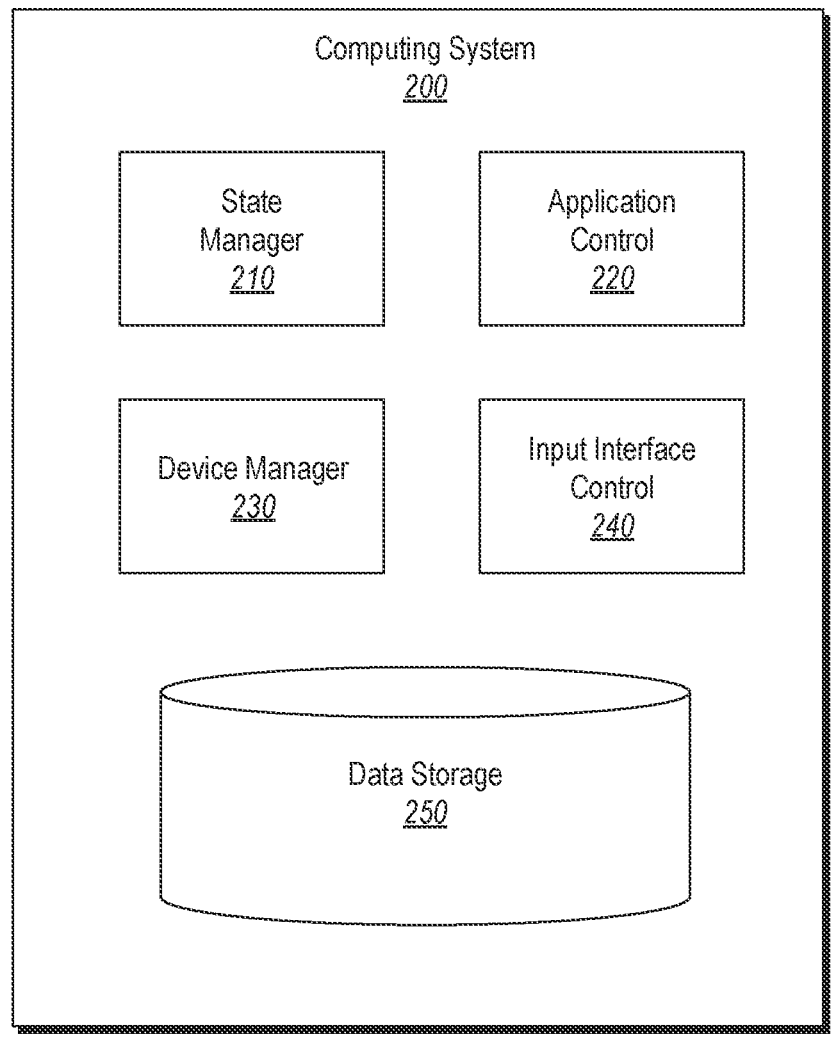
FIG. 2 illustrates another view of computer system that includes and/or that may be used to implement aspects of the disclosed embodiments.

As discussed above, computer systems are able to provide a broad variety of different functions. One such function includes facilitating the manner in which a user interacts with virtual content included within an augmented-reality scene. Accordingly, attention will now be directed to FIG. 2, which illustrates another representation of an exemplary computer system 200 that may be used to provide the disclosed functionality. This, computer system 200 is analogous to and/or incorporated within computer system 100 of FIG. 1, in that it includes all of the same capabilities as computer system 100.

As illustrated, computer system 200 includes a state manager 210, an application control 220, a device manager 230, and an input interface control 240. Computer system 200 also includes data storage 250.

The state manager 210 is configured to track the runtime states of different applications and application elements and data, particularly with regard to how user input detected by and/or processed by the application(s) modifies application data and/or triggers application functions. The state manager 210 also tracks which applications are in an active state for enabling the applications to apply detected user input directed at the application(s) and/or that is detected while an application is in an active state, and which applications are in an inactive display only state that are not configured for detecting and/or applying user input received while the application is in an inactive display only state.

The state manager 210 also tracks the state of a user and contextual information associated with the augmented-reality environments (e.g., locations of use, user preferences and permissions, the capabilities/settings and display area boundaries of display devices, the states of sensors and sensor data, and/or any other state data).

The state information also includes the location and other state information associated with the control objects and/or input devices that are used to receive, process and/or reflect user input, including input that is directed at selecting, moving and/or interacting with the virtual and real-world object instances of the application interfaces. The various information tracked by the state manager 210 is stored in electronic form within state tables or records stored in data storage 250.

The application control 220 is configured to instantiate and execute applications and to generate the virtual and real-world object instances of the application interfaces that are displayed within augmented-reality environments. The application control 220 is configured to render the different object instances with one or more different presentation formats corresponding to different sets of display properties (e.g., size, color, shape, texture, highlighting, transparency, intensity, animation, style, selection of displayed application elements, and/or any other display attribute). In some instances, the application control 220 renders virtual object instances of an application interface with a different presentation format than a corresponding real-world object instance of the same application interface. In other instances, the virtual object instances and the real-world object instances of an application interface are rendered with the same presentation format, such as when they are displayed within a same location (e.g., within a bounded area of a physical display) or when they are rendered in a particular context or state (e.g., active or inactive state).

The application control 220 is also configured to control which instances of the application interfaces are in an active state configured for processing user input and which applications are in an inactive state in which the applications ignore or refrain from processing user input. The application control manager 210 is configured, in some instances, to selectively control the application states based on the state information tracked by the state manager 210, as well as based on user inputs.

The device manager 230 is configured to selectively control which display device(s) (e.g., HMD100A, display device 100C or other devices 100B) are used to render the different virtual and real-world object instances of the application based on the different state data and at least according to the examples described below with reference to FIGS. 3A-7.

The input interface control 240 is configured to manage different input devices and to interpret the different sensor data and/or inputs identified by and/or received at the different I/O interfaces 130 and sensors 150, 160, to determine when the user input should be processed and for providing the input that should be processed to the corresponding state manager 210, application control 220 and device manager 230 for controlling selection of, movement of, and interaction with the object instances of the application interfaces. In some instances, the input interface control 240 is capable of detecting when a user is directing attention to a particular object instance, such as with a detected gaze or gesture, or when input is received from an input device that controls movement and selections made with control object (e.g., mouse prompt or other control object) of an application.

The input interface control 240 is also configured to selectively control when/which control objects are in an active state (in which the control objects are configured for identifying and/or processing user input) and when/which control objects are in an inactive state (in which they do not respond to detected user input received while in the inactive state).

The storage 250 stores computer-executable instructions that are executed by one or more processors of the system to implement the disclosed functionality and to instantiate many of the disclosed system components (e.g., 210, 220, 230, 240), as well as the various state data. The storage 250 also stores, in some embodiments, the images and other visual data required for rendering the object instances of the application interfaces.

It will be appreciated that the foregoing components can be incorporated into an HMD or other device configured to render virtual content in a mixed-reality environment. The foregoing components can also be incorporated into a console or client computer that is connected to the HMD through a network. In other embodiments, the foregoing components are incorporated into one or more remote systems 180 (e.g., a distributed or universal cloud system) which is configured to control the rendering of the referenced objects and application instances on the different devices (e.g., physical PC display screens and augmented reality HMD device displays). Such a distributed cloud environment can be particularly useful for managing the different devices according to their different logical connections and contextual appropriateness. This type of cloud configuration can include the HMD devices (100A) and the client systems (100) in combination with the remote system(s) 180.

The functionality of the foregoing components and systems will be more apparent in view of the following discussions providing representative examples of computing systems and methods for facilitating the manner in which a user interacts with virtual content in an augmented-reality scene.

Interacting with Virtual Content

FIGS. 3 illustrates an augmented-reality environment in which a user is wearing an HMD 300 that visualizes a scene within a limited field of view (302) that is encompassed within the area represented by the dashed lines. The HMD 300 may comprise or be connected to the computer system(s) described above (e.g., 100, 200).

In this example, the scene is presented with real-world objects that are visible to the user, such as a display screen 320 that has a bounded display area 322. Currently, the display screen 320 is rendering a real-world object instance (324) of an application interface of an application that is running on the system, which the user can interact with, such as with mouse prompt 326 (by using mouse controller 330) and/or by using another control object associated with the application, and/or a different application running on the system, and which is controlled by the mouse 330 or another input device associated with the system.

In this example, the mouse prompt 326 and the real-world object instance (324) of the application interface are both examples of interactive control objects associated with the application and which can be interacted with to trigger transitions for rendering representations of the interactive control objects within the augmented-reality scene.

Figure 3A:
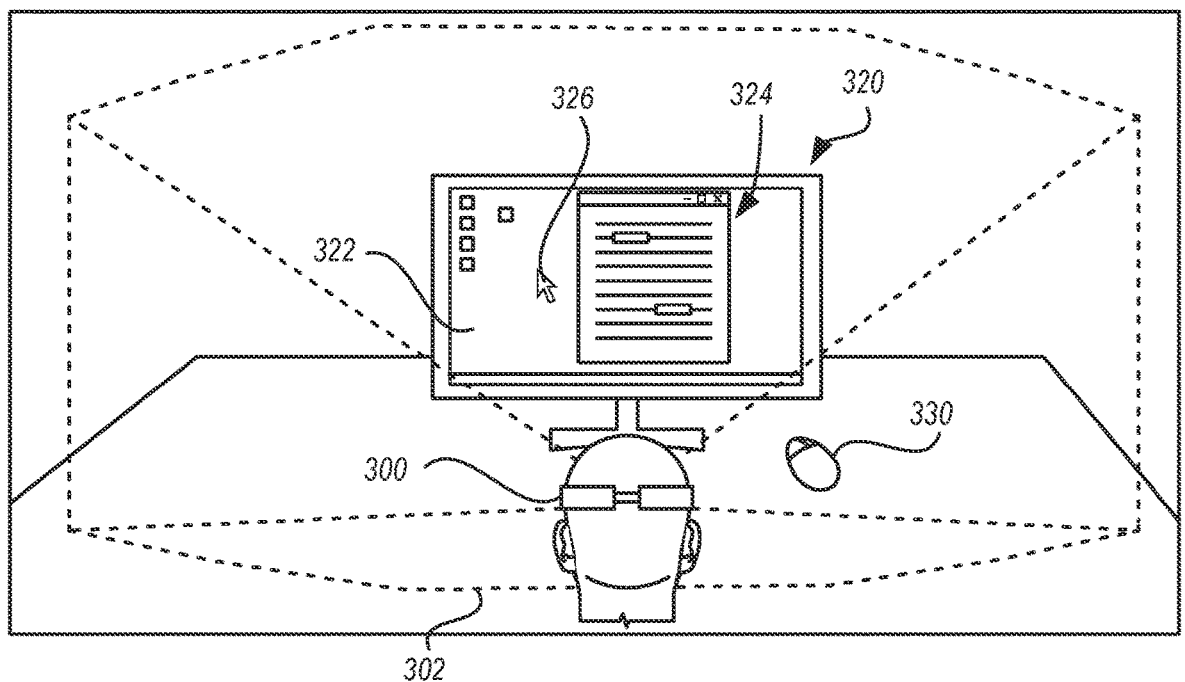
FIGS. 3A-5E illustrate various representations of augmented-reality scenes in which controllable interface objects (e.g., application interfaces and mouse cursors) are presented and transitioned between different virtual and real-world display formats, as well as being moved to different positions relative to the bounded display area of a physical display device that is visible within the augmented-reality scenes.
Figure 3B:
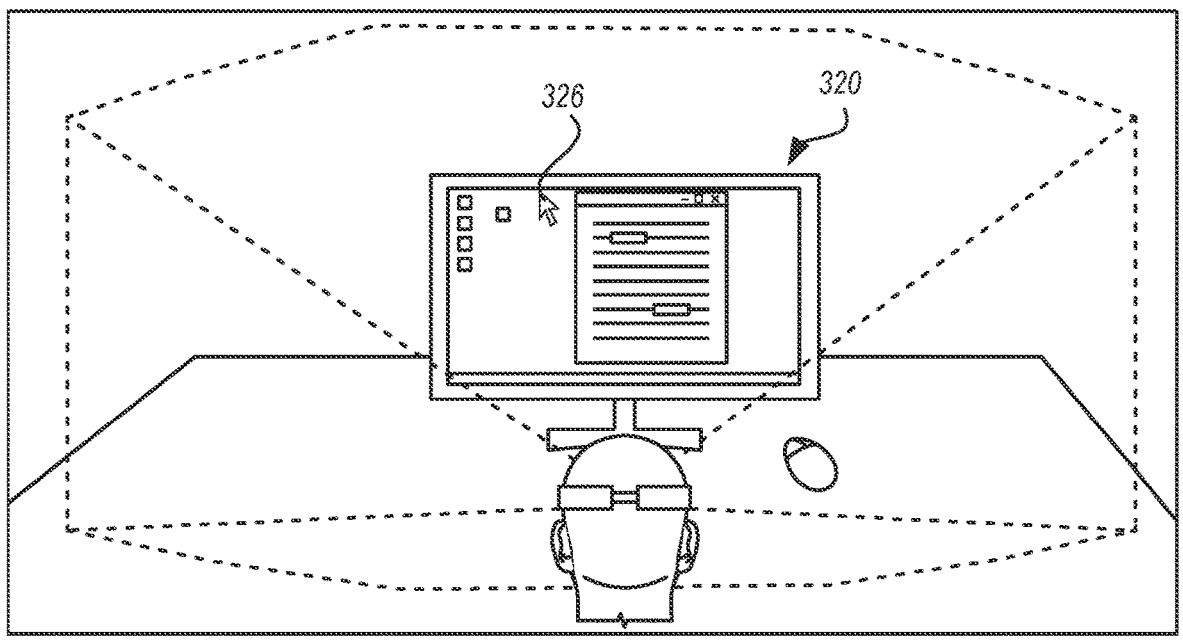
Figure 3C:
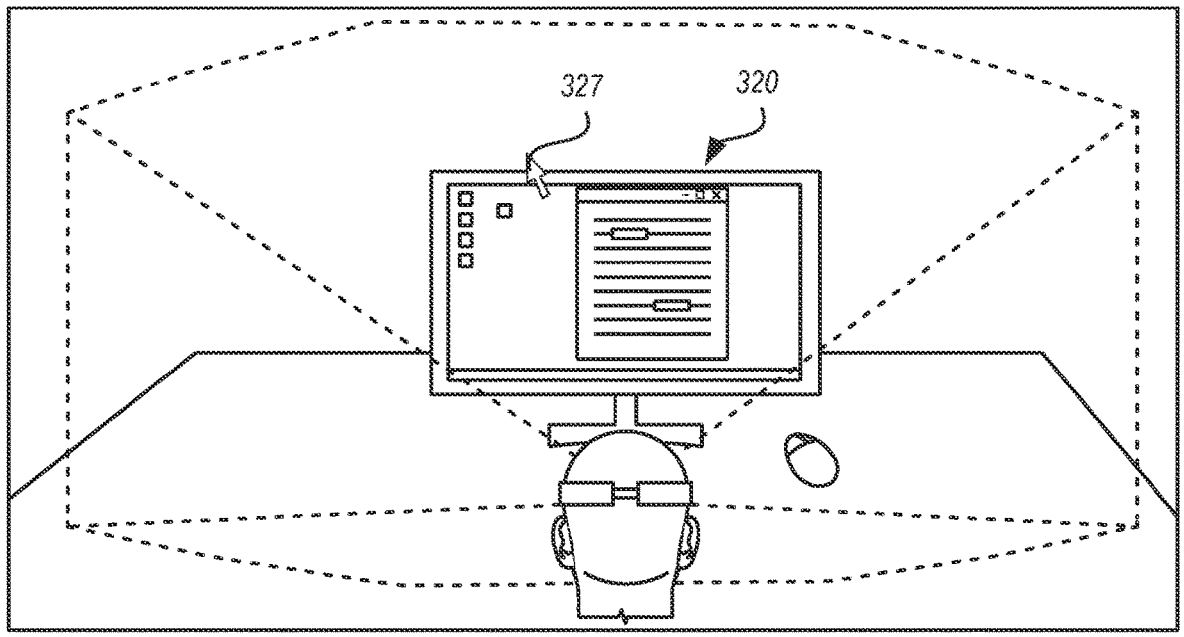
Figure 3D:
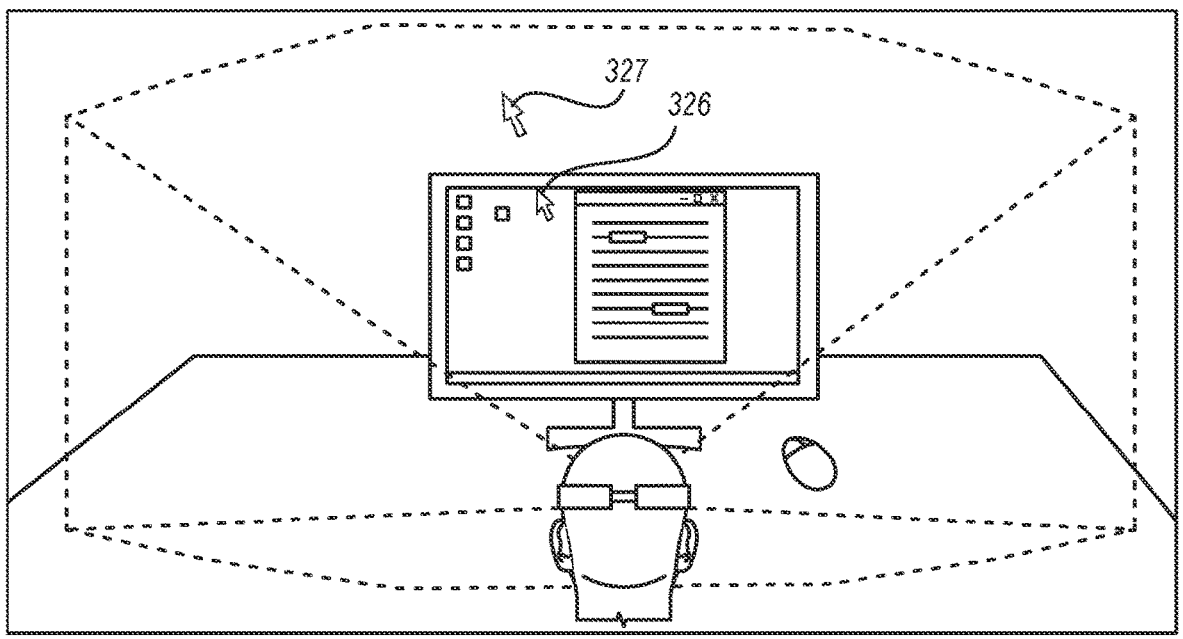

By way of example, FIG. 3B illustrates a similar scene in which a user has provided input for moving the mouse prompt 326 to and/or beyond the edge of the bounded display area of the display screen. Since the mouse prompt is a real-world object instance or representation of the interactive control object, it cannot be physically moved outside of the bounded display area of the real-world display screen. Accordingly, the mouse prompt is displayed as only moving to the furthest point possible within the display area, based on the directional input received from the user.

However, according to the current embodiments, it is possible to represent movement of the mouse prompt beyond the display area, commensurate with the user input, by generating and rendering a virtual object instance of the mouse prompt within the augmented-reality environment outside of the bounded display area of the display screen. This is shown, for example, by the representation of the virtual object instance of the mouse prompt (327) in FIGS. 3C and 3D.

In some instances, the virtual object instance of the mouse prompt 327 is generated as soon as input is received and/or processed for moving interactive control element (mouse prompt) outside of the bounded display area. In other instances, the virtual object instance of the mouse prompt 327 is generated only in response to detecting and/or processing user input that is directed at or sufficient for moving a predetermined or threshold percentage of the interactive control element (mouse prompt) outside of the bounded display area. This predetermined percentage may be more or less than 50% of the interactive control element to accommodate different user experiences and to provide a buffer for unintended user input that was accidentally provided by the user without intending to trigger a movement of the interactive control element outside of the bounded display area.

In the present example, the real-world object instance of the mouse prompt (326) is shown concurrently with the virtual object instance of the mouse prompt (327). However, in other embodiments, the system will terminate a display of the real-world mouse prompt 326 in response to rendering the virtual object instance of the mouse prompt (327), and/or only in response to receiving or processing user input that is directed at and determined to be sufficient for moving the interactive control element all the way out of (or a predetermined percentage of the way out of) the bounded display area.

Figure 3E:
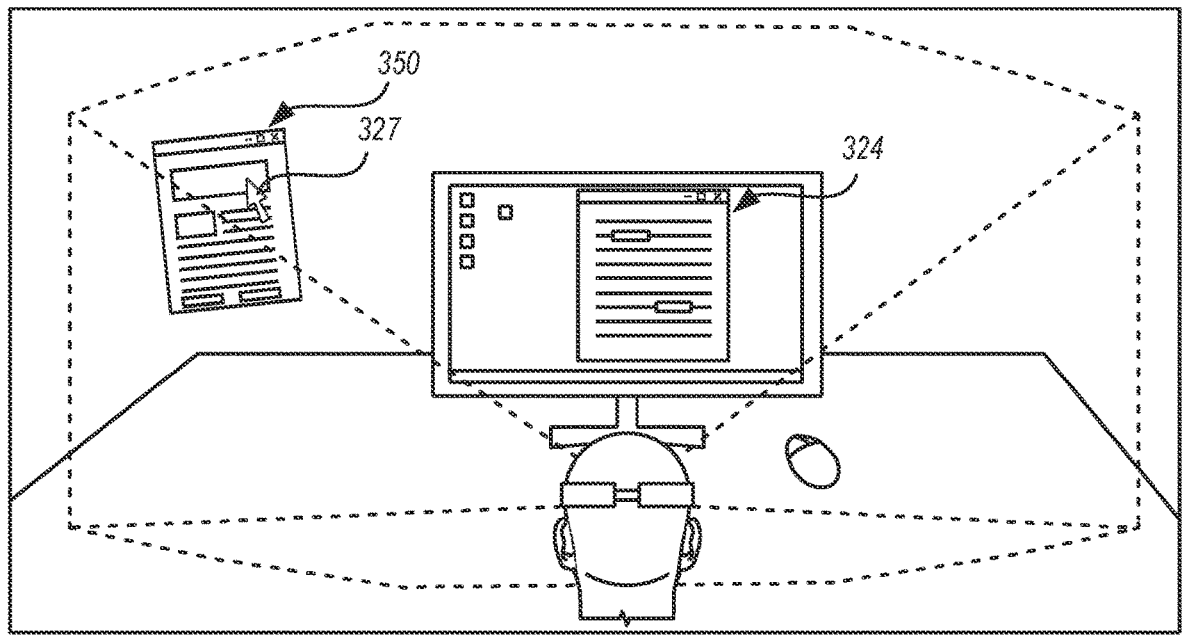

FIG. 3E illustrates a representation of a scene in which a display of the real-world mouse prompt 326 has been terminated and in which the virtual object instance of the mouse prompt 327 is shown.

FIG. 3E also illustrates how the virtual object instance of the mouse prompt 327 can operate as the interactive control object of an application to interact with one or more virtual objects in the augmented-reality scene (e.g., a virtual object display of another application interface (350)).

The virtual object instance of the mouse prompt 327 can also operate as an interactive control object of an application for interacting with one or more elements of a virtual object display instance (352) of the application interface and which corresponds to the same real-world object instance (324) of the application interface that is sometimes displayed simultaneously in the same presentation formats, or with different presentation formats.

As described earlier, different interactive control objects can be rendered with the same presentation formats or different presentation formats, depending on their state, by modifying one or more display attributes of the corresponding virtual and/or real-world object instances.

Figure 3F:
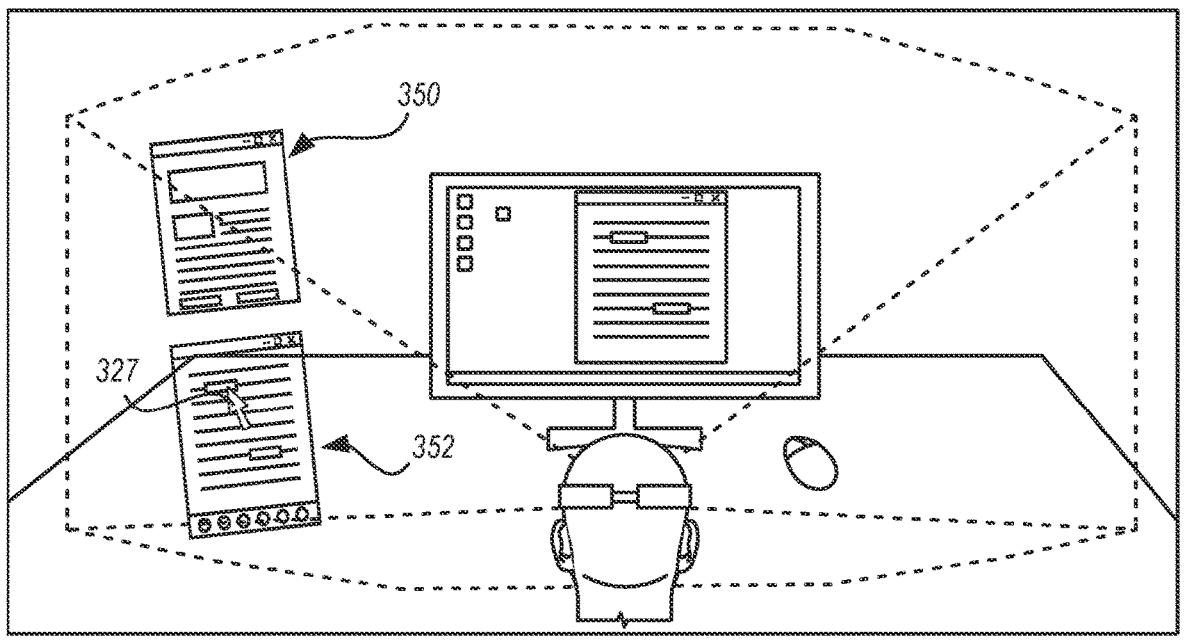

In the present example, shown in FIG. 3F, the virtual object instance (352) of the application interface is rendered with a different presentation style used to render the real-world object instance (324) of the same application interface by at least presenting a different set of display elements (selectable menu icons shown at the bottom of the virtual object instance 352) that are not presented at all or in the same format as presented on the real-world object instance (324) of the same application interface. These additional items may correspond specifically to functionality for interacting with a virtual object and that are not relevant to real-world objects.

In some instances, the virtual object instance (352) of the application interface is at least partially scaled up (enlarged relative to the size of the real-world object instance (324)) to facilitate visibility and the usability of the different menu icons that are engaged with by a user's hand or other controller. More particularly, the enlarged size of the virtual object instance (352) or at least some of the interactive icons and menu control objects displayed within the virtual object instance (352) facilitates a user's ability to interact with those objects. It also makes those objects more visible to a user within the virtual environment on the lower resolution HMD, since the HMD does not display the interface with the same higher resolution that is used for rendering the real-world object instance (324) on the physical display (e.g., a high-definition display).

Although not shown, the virtual object instance of the mouse prompt 327 can also operate as the interactive control object of an application to interact with one or more real-world display elements rendered on the display screen, such as, but not limited to the real-world object instance (324) of the application interface.

Figure 4A:
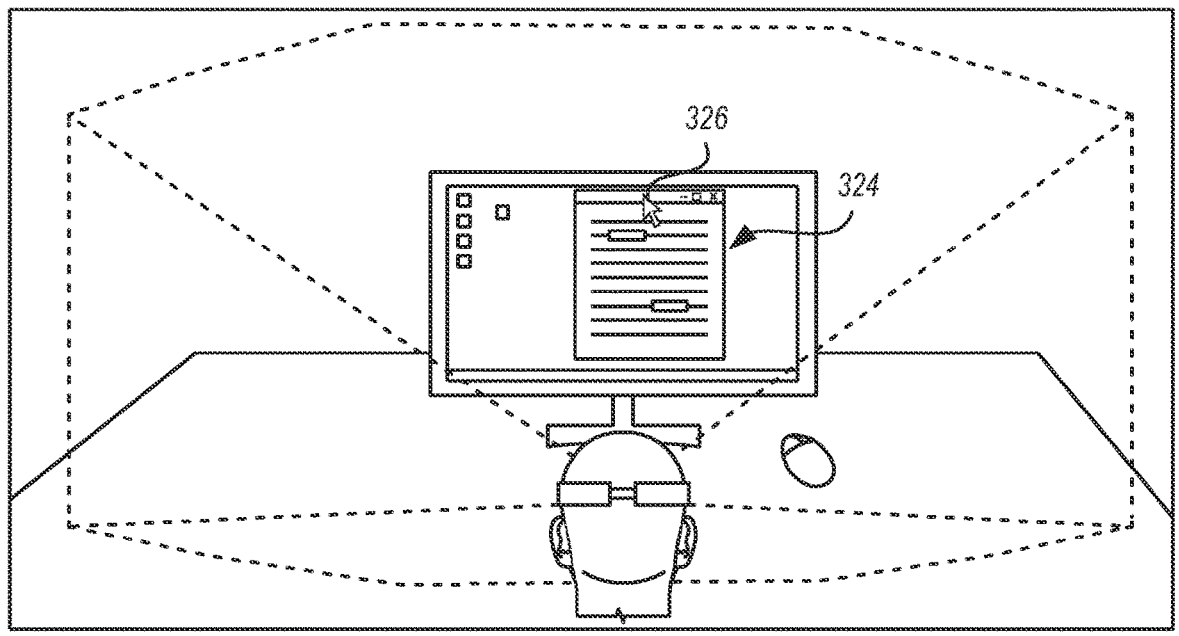
Figure 4B:
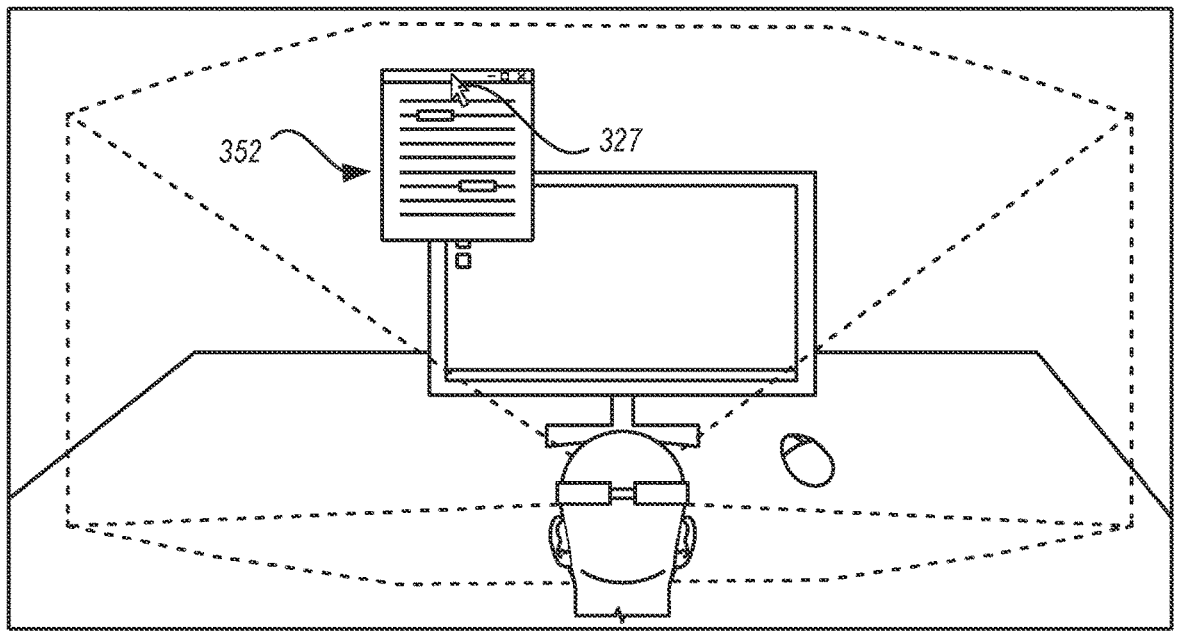
Figure 4C:
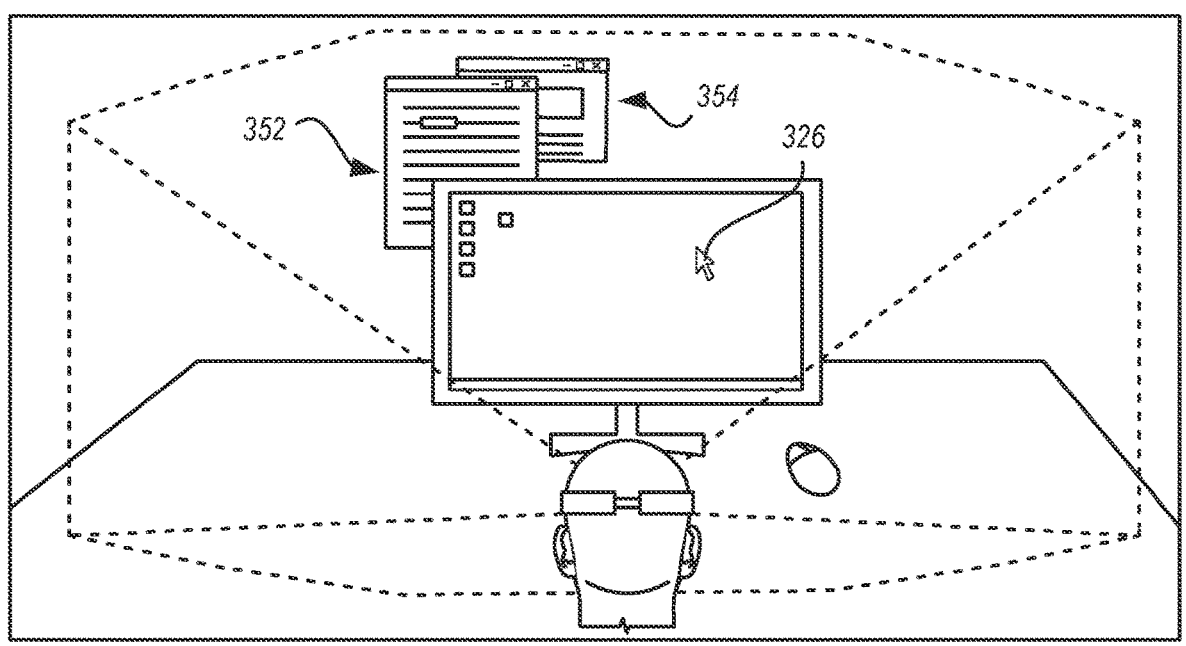

Attention will now be directed to FIGS. 4A-4C. These illustrations represent examples in which a user provides input for controlling movement and selections made by a mouse prompt 326 for selecting and moving (dragging) another interactive control element, comprising a real-world object instance (324) of an application interface, passed and outside of the boundaries of the bounded display area. As in the previous example, this input triggers the rendering of a virtual object instance (352) of the application interface that is rendered at the location in the scene that corresponds with the detected input.

In some instances, once the virtual object instance (352) of the application interface is rendered and/or moved a predetermined percentage of the way outside of the bounded display area 322 within the scene, the system will terminate a display of the real-world object instance (324) of an application interface.

To help manage and organize a plurality of different virtual objects and/or real-world display objects, the system is also configured to render the different objects with a relative depth (to present different objects in front of and/or behind other objects) within the scene. This is shown in FIG. 4C with virtual object instance (352) positioned in front of virtual object 354 and behind some objects rendered in the display area 322 of the display screen. This relative position can be based on user input directed at changing a relative distance of the objects to the user, timing of focus directed at the different objects, user preferences and/or priorities associated with the different objects.

Figure 5A:
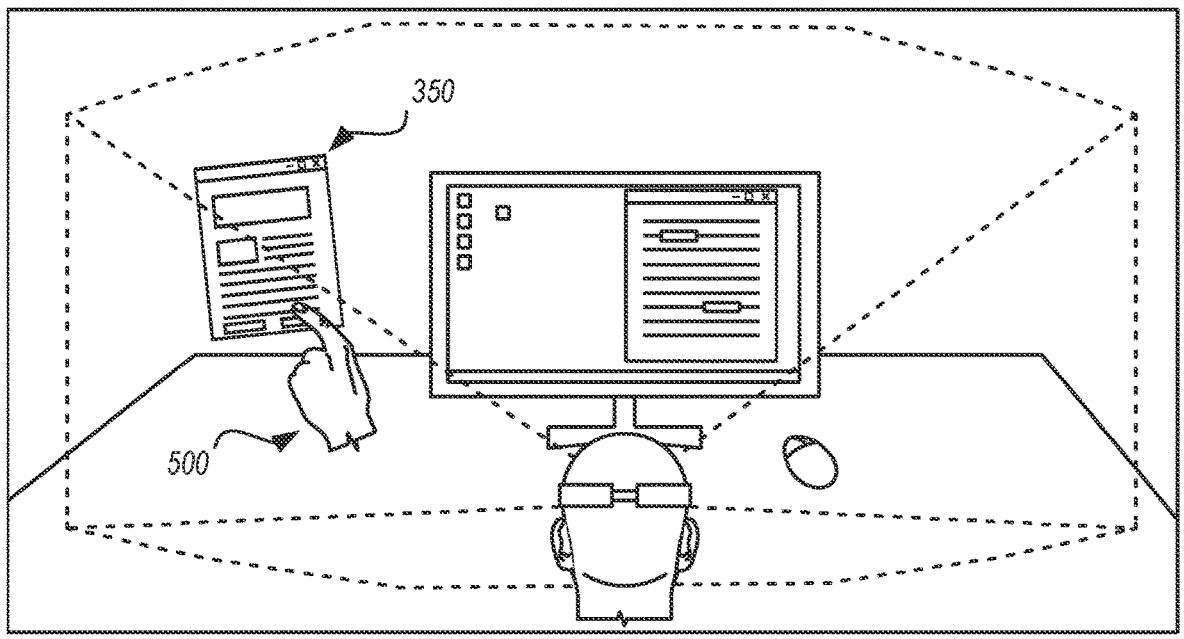
Figure 5B:
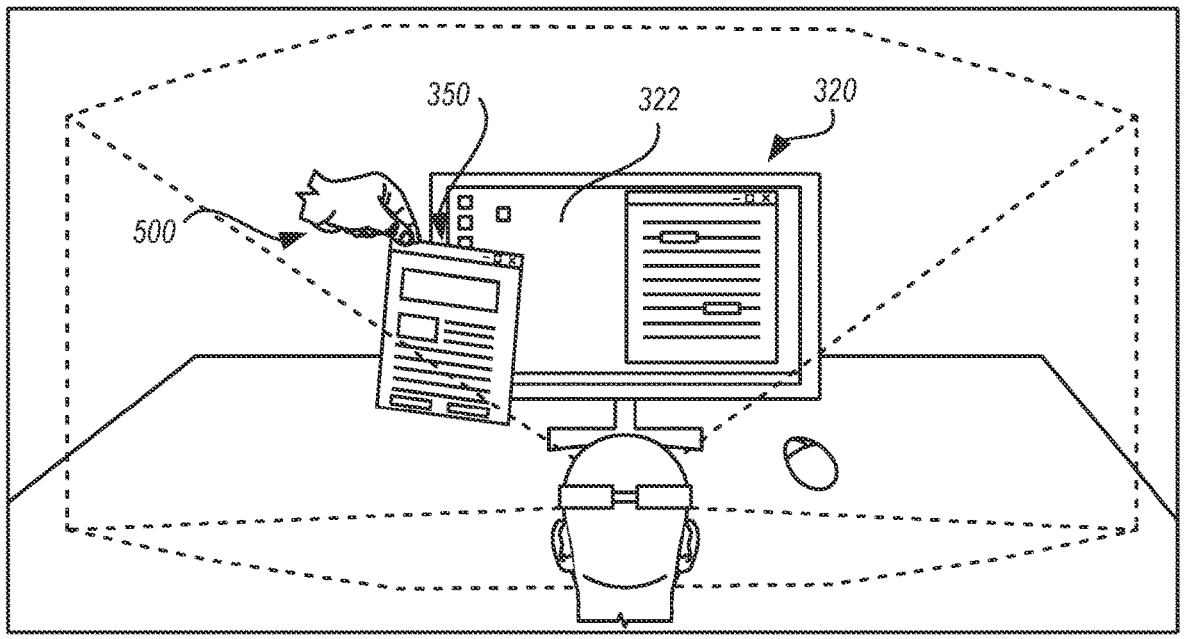
Figure 5C:
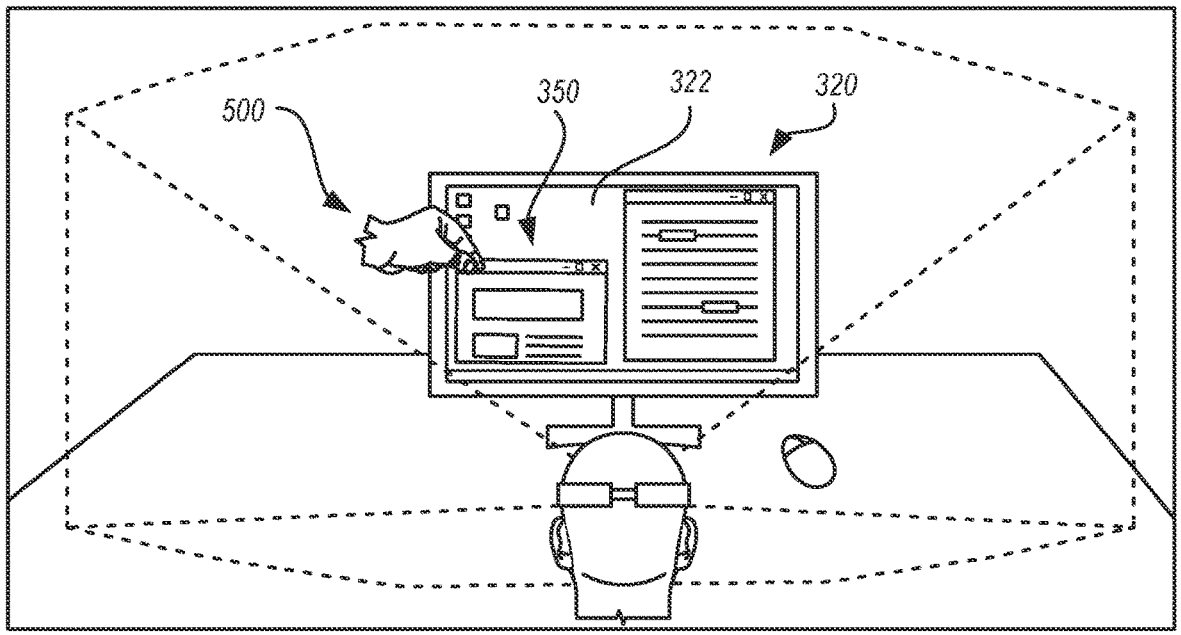
Figure 5D:
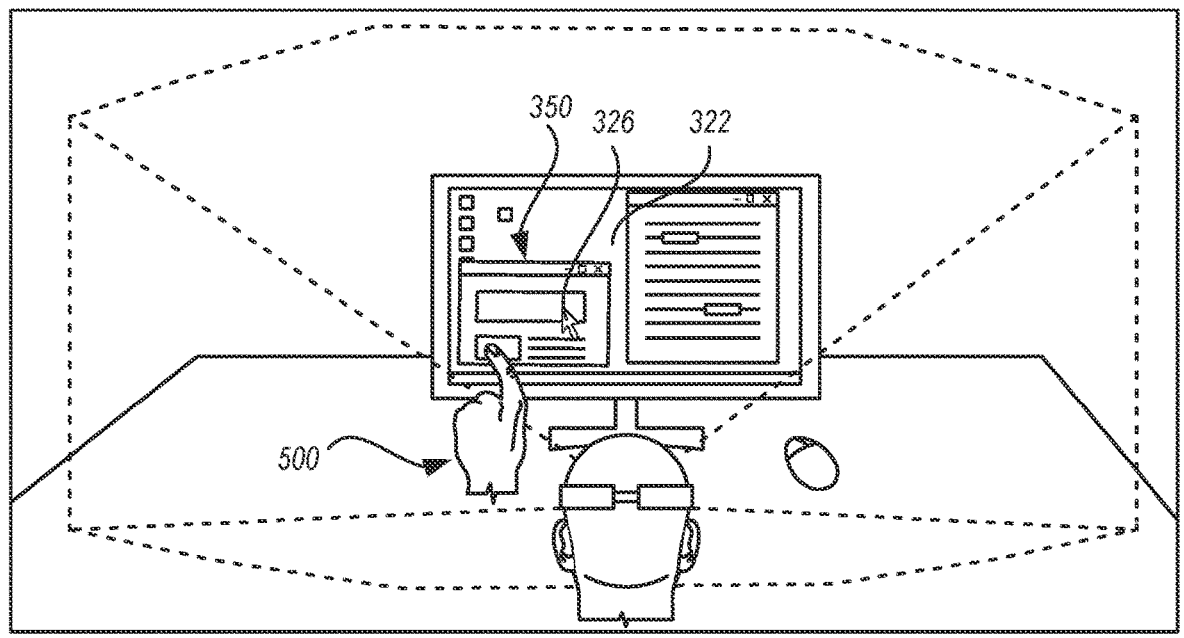

FIGS. 5A-5E illustrate embodiments in which a user's hand 500 (or a virtual representation of the user's hand) is used as a controller for interacting with elements of a virtual object instance (350) of an application interface, as shown in FIGS. 5A and 5D. Such interactions can trigger functionality of the corresponding application.

Other interactions can include moving an interactive control object represented by the virtual object instance (350) of the application interface from a first location outside of the bounded display area of the display screen to a location that is at least partially within the bounded display area, as shown in FIGS. 5B and 5C, and which is caused by a grabbing and dragging gesture of the user's hand 500 that is applied to the virtual object instance (350).

In some instances, and in response to user input for moving the interactive control object represented by the virtual object instance (350) from the first location to the second location, which positions a predetermined threshold of the interactive control object within the bounded display area 322 of the display screen, the system will automatically render the interactive control object entirely within the bounded display area 322, as shown in FIG. 5C, such that no portion of the interactive control object is rendered outside of the bounded display area, and even if it means only a portion of the control object is rendered in the scene.

When the system renders the interactive control object entirely within the bounded display area 322, as shown in FIGS. 5C and 5D, the interactive control object can be rendered as the virtual object instance or as the real-world object instance and based on a determination made by the system with state data as to whether to generate and render the real-world object instance.

Figure 5E:
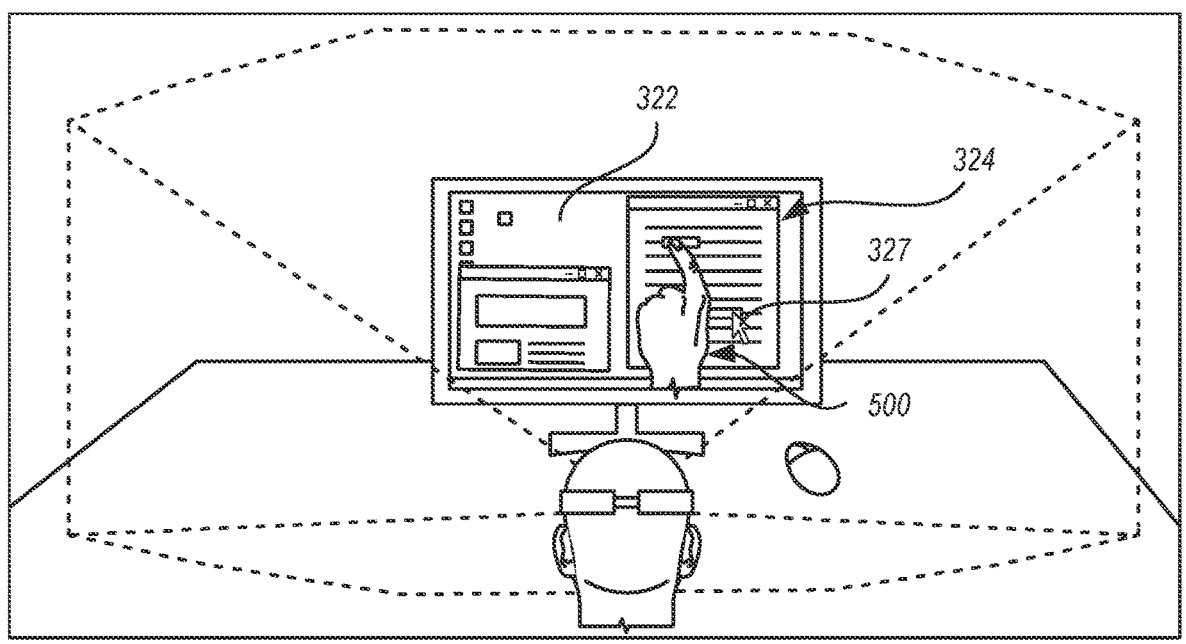

FIGS. 5D and 5E illustrate how the user's hand object 500 can be used (as a real-world object in FIG. 5D, or as a virtual representation of the user's hand in 5E) to interact with virtual and real-world object instances (350 and 324, respectively) of different application interfaces that are rendered within the bounded display area 322 of a display screen within an augmented-reality scene. Mouse prompts 326 and 327 can also be used to interact with the different objects as well, as described previously.

Figure 6:
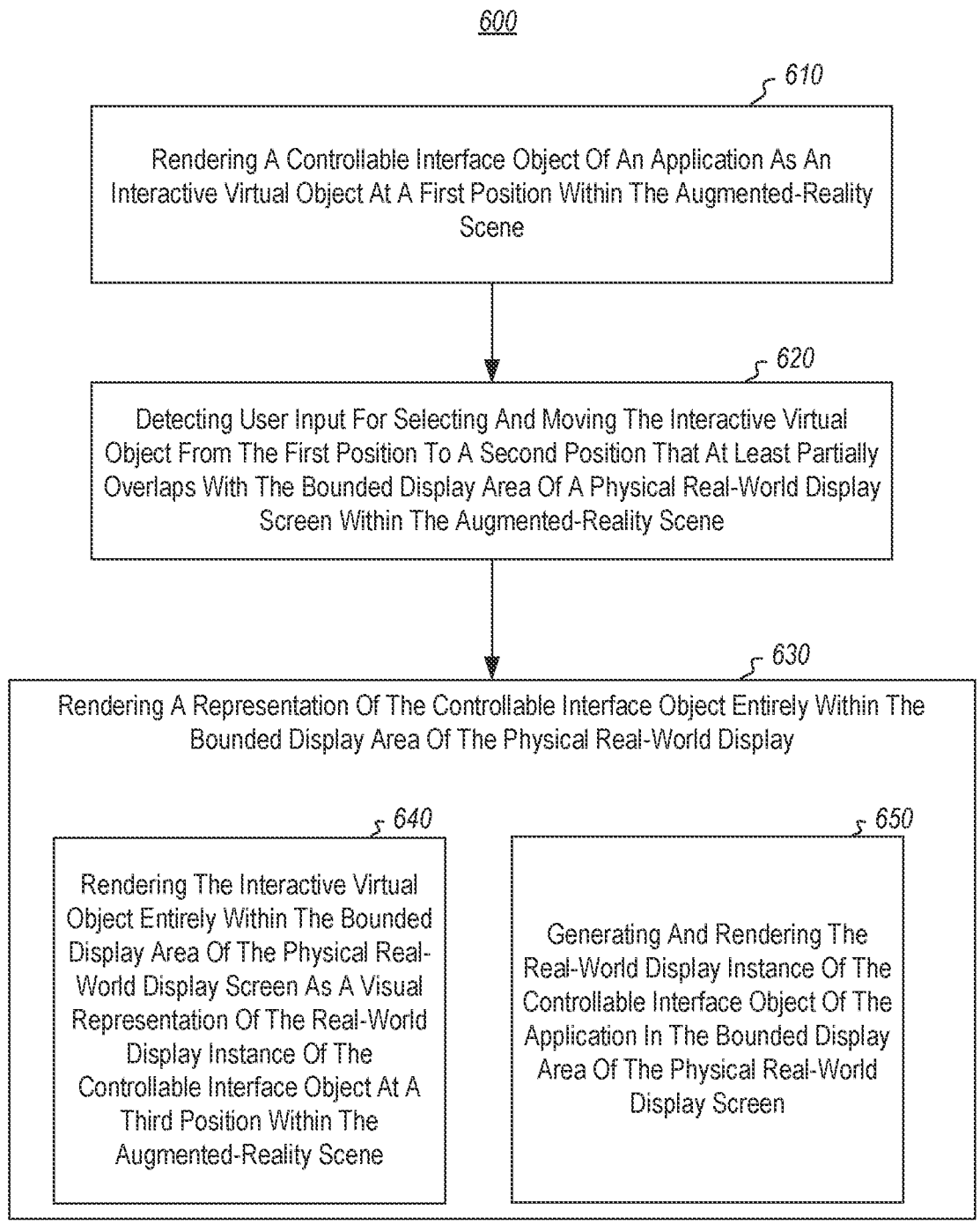
FIG. 6 illustrates a flow diagram of acts associated with exemplary methods for facilitating the manner in which a controllable interface object is first rendered as a virtual object at a first position outside of a bounded display area of a physical real-world display screen that is visible within an augmented-reality scene and in which the controllable interface object is subsequently rendered entirely within the bounded display area, deterministically, as either the virtual object and/or as a corresponding real-world object instance of the controllable interface object.

Attention will now be directed to FIG. 6 which illustrates a flow diagram 600 of various acts (610, 620, 630, 640 and 650) associated with exemplary methods for facilitating the manner in which a controllable interface object is rendered in an augmented-reality scene.

The controllable interface object may comprise, for example, an application interface displaying content associated with an underlying application that is run on a system associated with presenting the augmented-reality environment/scene and which includes one or more interface elements that can be selected and/or interacted with by a mouse prompt or other control object. In additional or alternative embodiments, the controllable interface comprises a mouse prompt or other control object that is configured to select and interact with display elements of the above-referenced application interface and/or other application interfaces and objects presented within the augmented-reality environment in response to user input received at an input device associated with the mouse prompt or other control object (e.g., a mouse, a sensor that tracks hand movements, etc.)

As shown in FIG. 6, the controllable interface object is first rendered as a virtual object at a first position (e.g., a first location and/or orientation) outside of a bounded display area of a physical real-world display screen (act 610). Then, in response to user input directed at moving the controllable interface object controllable interface object to a second position (e.g., a second location and/or orientation) that is at least partially located within, or overlapping with, the bounded display area (act 620). Thereafter and responsively, the controllable interface object is rendered entirely within the bounded display area (act 630).

As previously described, the rendering of the controllable interface object entirely within the bounded display area includes, deterministically, rendering the controllable interface object as (i) the virtual object being rendered at a third position within the bounded display area of the augmented-reality scene (act 640) (e.g., at a third location and/or orientation, which may be the same as or different than the second position), and in response to determining not to render the real-world object instance of the controllable interface object within the bounded display area of the physical real-world display screen.

Alternatively, the rendering of the controllable interface object entirely within the bounded display area includes (ii) rendering a corresponding real-world object instance of the controllable interface object within the bounded display area (650).

In some instances, the rendering of any representation/instance of the controllable interface object entirely within the bounded display area of the physical real-world display only occurs after first determining that at least a threshold percentage of the interactive virtual object instance is positioned within the bounded area of the physical display screen in the augmented-reality scene and/or in response to detecting or processing user input sufficient for moving the controllable interface object (e.g., virtual object instance) at least the threshold percentage of the way into the bounded area of the physical display screen in the augmented-reality scene.

As also previously discussed, the disclosed embodiments further include configuring the computing system to render the real-world object instance of the interactive control object with a first presentation style, and to render the virtual instance of the controllable interface object with a second presentation style which is different than the first presentation style. In particular, the first presentation style includes rendering the real-world object instance with one or more display properties (e.g., a size, coloring, shape, texture, etc.) that are different than the same corresponding display properties used for rendering the virtual instance of the controllable interface object. This can be helpful for visually distinguishing virtual and real-world object instances of the same application interfaces within an augmented-reality environment.

Additionally, as previously mentioned, the HMD display typically renders the virtual objects at a lower resolution than the physical screen is capable of using for rendering objects. Accordingly, it can be helpful to upscale the displayed size of the virtual objects to compensate for the lower resolution in which they are displayed. The different size of presentation can also facilitate the ability of a user to select and interact with the object elements displayed in the virtual instances of those objects.

In alternative embodiments the virtual and real-world object instances of the same application interfaces are presented with the same presentation styles to visually reflect an association of the virtual and real-world objects to a corresponding and consistently presented interactive control object and/or application interface.

The disclosed embodiments also include configuring the computing system to (i) terminate a rendering of the virtual instance of the controllable interface object while rendering the real-world object instance of the controllable interface object and to (ii) refrain from rendering the real-world object instance of the controllable interface object while rendering the interactive virtual object instance entirely within the bounded display area of the physical real-world display screen as the visual representation of the real-world object instance of the controllable interface object.

Figure 7:
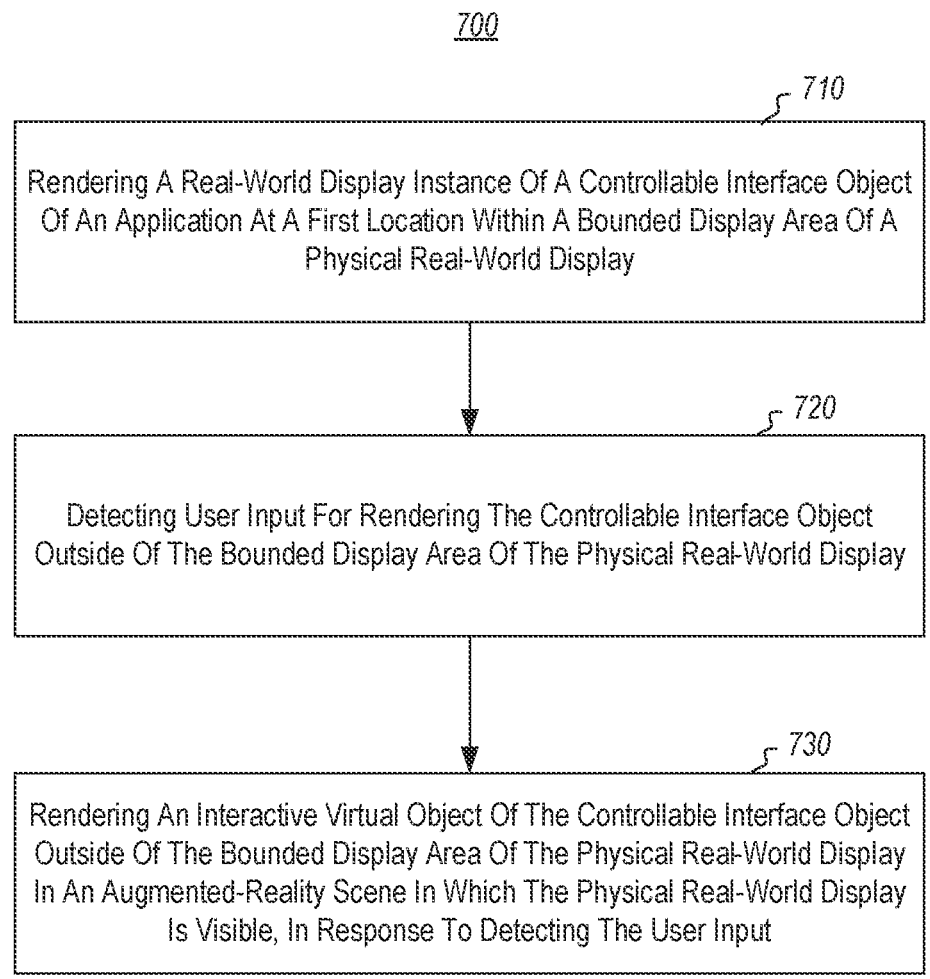
FIG. 7 illustrates a flow diagram of acts associated with exemplary methods for facilitating the manner in which a controllable interface object is first rendered as a real-world object instance of a controllable interface object within a bounded display area of a physical real-world display screen that is visible within an augmented-reality scene and in which the controllable interface object is subsequently rendered at least partially outside of the bounded display area with an interactive virtual object instance of the controllable interface object in response to input for moving the controllable interface object outside of the bounded area of the display screen.

Attention will now be directed to FIG. 7, which illustrates a flow diagram 700 of acts associated with other exemplary methods for facilitating the manner in which a controllable interface object (e.g., an application interface or interactive control object) is rendered within an augmented-reality scene. In this embodiment, the controllable interface object is first rendered as a real-world object instance within a bounded display area of a physical real-world display screen that is visible within an augmented-reality scene (act 710). Then, in response to detecting user input for rendering the controllable interface object outside of the bounded display area of the physical real-world display (act 720), the controllable interface object is subsequently rendered at least partially outside of the bounded display area as a virtual object instance of the controllable interface object (act 730).

Notably, the user input for rendering the controllable interface object outside of the bounded display area of the physical real-world display includes user input for selecting and moving the real-world object instance of the controllable interface object from at least the first position within the bounded display area to a second position that is at least partially outside of the bounded display area of the physical real-world display.

These embodiments also include configuring the computing system to render the real-world object instance of the controllable interface object at one or more different positions than the first and second positions, entirely within and/or adjacent to an edge of the bounded display area of a physical real-world display, and in response to detecting user input for selecting and moving the real-world object instance of the controllable interface object from the first position to a second position within the bounded display area of the physical real-world display.

This configuration enables the animation of the controllable interface object as it is moved from the first position to the second position. This may also include leaving a representation of the controllable interface object (e.g., the real-world object instance) within the bounded display area, along the edge of the display area, while rendering the corresponding virtual object instance outside of the display area.

This configuration can be particularly useful when rendering a first portion of the controllable interface object with the virtual instance of the controllable interface object outside of the bounded display area while rendering a remaining portion of the controllable interface object with the real-world object instance at the second position within the bounded display area, and in such a manner that it appears that the first portion and the second portion of the controllable interface object are connected together as an integrated version of the controllable interface object. The portions of each object instance that are rendered will dynamically change to reflect the relative movement of the controllable interface object. It will be appreciated that this can enhance the user experience by making the animated movement of the controllable interface object more seamless.

The disclosed embodiments also include configuring the computing system to terminate a display of the real-world object instance of the controllable interface object in response to generating the virtual rendering the virtual instance of the controllable interface object and/or in response to input that is operable for moving the controllable interface object partially or entirely outside of the bounded display area of the display screen. This configuration can be particularly helpful for reducing the computational load associated with rendering multiple object instances of the same controllable interface object.

Yet additional embodiments include configuring the computing system to modify how the virtual instance of the controllable interface object is rendered in a first presentation mode with a first set of display properties (e.g., size, texture, transparency, coloring, intensity, etc.) and a second presentation mode with a different set of the same or different display properties.

In some instances, the first presentation mode corresponds to a complete rendering of the virtual instance of the controllable interface object and/or a rendering in which a portion of the virtual instance of the controllable interface object is displayed in front of and overlapping with the physical real-world display in the augmented-reality scene. In such instances, the second presentation mode corresponds to a rendering of the virtual instance of the controllable interface object is displayed behind the physical real-world display, with a portion of the virtual instance of the controllable interface object being omitted from the augmented-reality scene, and in response to detecting attention directed to the physical real-world display subsequent to displaying the virtual instance of the controllable interface object in the first presentation mode.

This configuration is beneficial for enhancing the user experience by enabling the different object instances of the controllable interface to be presented with relative depth (e.g., based on their relative size, transparency, and other display attributes) in the augmented-reality environment. This is particularly helpful when the objects are positioned along a same line of sight or directional axis relative to the user, thereby providing an appearance of stacking or overlapping the different objects within the visual space of the augmented-reality scene.

In such embodiments, objects can be rendered in relative position/proximity to the user within the scene by using the different presentation modes and display attributes and which are selected based on various state data (e.g., the recency of the object receiving user input or focus, recency of the corresponding application receiving data updates or performing application processing, explicit movement or positioning instructions/input received by the user, etc.), The presentation modes can also be switched for the different objects dynamically, in response to changing circumstances and state data. For instance, in some embodiments, the systems are further configured to render the interactive virtual object instance in the first presentation mode, subsequent displaying the virtual object instance of the controllable interface object in the second presentation mode, and in response to detecting attention directed to the virtual object instance of the controllable interface object subsequent to displaying the virtual object instance of the controllable interface object in the second presentation mode.

As previously noted, the virtual and real-world object instances that have been described can be interactive, such that the computing systems can also be configured to process a selection of an element rendered within the virtual and/or real-world instances of the controllable interface object by a control prompt presented in the augmented-reality environment (e.g., a mouse prompt rendered by within the physical real-world display screen).

In other instances, the referenced controllable interface object having the virtual and/or real-world object representations/instances comprises a control prompt (e.g., a mouse prompt) and the computing system is configured to select a particular object displayed within the augmented-reality scene with the control prompt, such as, for example, in response to at least detecting user input for moving the virtual instance of the controllable interface object to the particular object within the augmented-reality scene.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable hardware storage media having stored thereon computer-executable instructions, the computer-executable instructions being executable by the one or more processors to configure the computer system to:
on a wearable display of a head-mounted device, render an augmented-reality scene for a user who is wearing the wearable display;
render a controllable interface object of an application that is running on the computing system as an interactive virtual object instance, the interactive virtual object instance being rendered at a first position within the augmented-reality scene, the first position being located outside of a bounded display area of a physical real-world display screen that is also visible within the augmented-reality scene;
detect user input for selecting and moving the interactive virtual object instance from the first position to a second position within the augmented-reality scene, the second position at least partially overlapping with the bounded display area of the physical real-world display screen within the augmented reality scene; and
in response to detecting the user input for selecting and moving the interactive virtual object instance from the first position to the second position within the augmented-reality scene, render a representation of the controllable interface object entirely within the bounded display area of the physical real-world display by at least:
rendering the interactive virtual object instance entirely within the bounded display area of the physical real-world display screen as a visual representation of the controllable interface object at a third position within the augmented-reality scene, in response to determining not to render a real-world object instance of the controllable interface object within the bounded display area of the physical real-world display screen.

2. The computing system of claim 1, wherein the controllable interface object is an application interface displaying content associated with the application.

3. The computing system of claim 2, wherein the computer-executable instructions are further executable for configuring the computing system to render the interactive virtual object instance as the application interface and to receive new user input that is operable for causing a mouse prompt rendered on the physical real-world display to visually intersect or overlap with and select a selectable display element of the application interface.

4. The computing system of claim 1, wherein the controllable interface object is a visual prompt configured for controllably selecting and interacting with content displayed on the physical real-world display.

5. The computing system of claim 4, wherein the computer-executable instructions are further executable for configuring the computing system to receive user input that is operable for causing the visual prompt to select one or more selectable display element of a real-world object instance of an application that is rendered on the physical real-world display.

6. The computing system of claim 5, wherein the computer-executable instructions are further executable for configuring the computing system to render both the real-world object instance of the application and the interactive virtual object instance of the controllable interface object at a same time within the augmented-reality scene.

7. The computing system of claim 5, wherein the computer-executable instructions are further executable for configuring the computing system to render the real-world object instance of the application with a first presentation style and to render the interactive virtual object instance of the controllable interface object with a second presentation style that is different than the first presentation style, the first presentation style having a size, coloring or shape for rendering the real-world object instance of the application that is different than a respective size, coloring or shape of the second presentation style for rendering the interactive virtual object instance of the controllable interface object.

8. The computing system of claim 5, wherein the computer-executable instructions are further executable for configuring the computing system to (i) terminate a rendering of the interactive virtual object instance of the controllable interface object while rendering the real-world object instance of the application and to (ii) refrain from rendering the real-world object instance of the controllable interface objectapplication while rendering the interactive virtual object instance of the controllable interface object entirely within the bounded display area of the physical real-world display screen as the visual representation of the real-world object instance of the controllable interface object.

9. The computing system of claim 1, wherein rendering a representation of the controllable interface object entirely within the bounded display area of the physical real-world display only occurs after first determining that at least a threshold percentage of the interactive virtual object instance is positioned within the bounded area of the physical display screen in the augmented-reality scene.

10. A method implemented by a computing system that includes one or more processors and one or more computer-readable hardware storage media having stored thereon computer-executable instructions, the computer-executable instructions being executable by the one or more processors to configure the computer system to implement the method, the method comprising:
on a wearable display of a head-mounted device, rendering an augmented-reality scene for a user who is wearing the wearable display;
rendering a controllable interface object of an application that is running on the computing system as an interactive virtual object instance, the interactive virtual object instance being rendered at a first position within the augmented-reality scene, the first position being located outside of a bounded display area of a physical real-world display screen that is also visible within the augmented-reality scene;
detecting user input for selecting and moving the interactive virtual object instance from the first position to a second position within the augmented-reality scene, the second position at least partially overlapping with the bounded display area of the physical real-world display screen within the augmented-reality scene; and
in response to detecting the user input for selecting and moving the interactive virtual object instance from the first position to the second position within the augmented-reality scene, rendering a representation of the controllable interface object entirely within the bounded display area of the physical real-world display by at least:

rendering the interactive virtual object instance entirely within the bounded display area of the physical real-world display screen as a visual representation of the controllable interface object at a third position within the augmented-reality scene, in response to determining not to render a real-world object instance of the controllable interface object within the bounded display area of the physical real-world display screen.

* * * * *